INVENTOR.
DEVAULSON D. NEWTON
BY Kenyon & Kenyon
ATTORNEYS

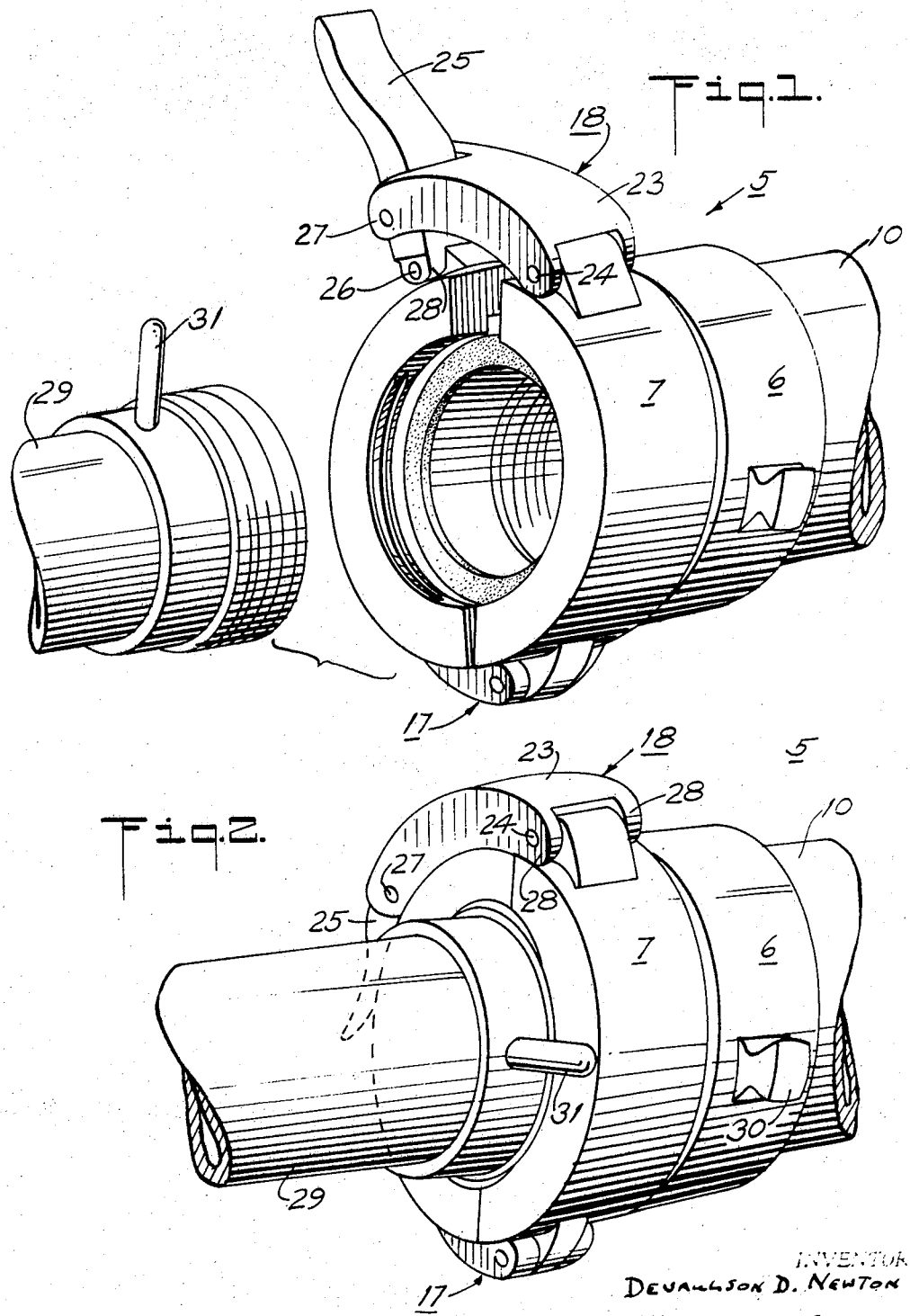

United States Patent Office 3,471,175
Patented Oct. 7, 1969

3,471,175
COUPLING DEVICE
Devaulson D. Newton, 64 Copeland Ave.,
Homer, N.Y. 13077
Filed Oct. 24, 1966, Ser. No. 588,797
Int. Cl. F16l 37/00, 55/00, 37/20
U.S. Cl. 285—35                    9 Claims

ABSTRACT OF THE DISCLOSURE

The coupling device is formed as a unit with a threaded tubular component for engaging a hydrant and a split collar component for securing a fire hose therein. The split portions are held together by a pivoted hinge clamp and the component is sized to remain permanently on the tubular component.

---

This invention relates to a coupling device for connecting tubular members together. More particularly, the invention relates to the coupling of a fire hose tubular member to a valve type member. Still more particularly, this invention relates to a coupling device for coupling a fire hose to a fire hydrant.

Heretofore, many types of coupling devices have been used for coupling tubular members together; however, such coupling devices have been cumbersome to use as well as inefficient in their use. Several of these coupling devices have incorporated mating projections or other configurations on their external surfaces for connection and release of the devices. For example, one form of such a coupling device has used a pair of hinged clamp portions having undercut threads on each portion to engage similar threading on the tubular members so that after the segmented collar portions have been positioned about the threaded portions of the tubular members rotation of the tubular members relative to each other. This has caused not only an abutting relation between the tubular members but also has served to lock the coupling device thereon. This type of coupling device, however, has not permitted a secure connection, especially for fire hoses, in that a slight rotation of either of the tubular members in a reversed direction from that described above may cause the coupling device to become loosened since there is no individual locking of the hinged clamp portions of the coupling device. Further, such devices have been extremely difficult to manipulate while securing the tubular members together.

Still other devices have incorporated a split collar effect with a toggle type latch arrangement encircling the split collars. In such devices the split collars have been separated so that a pair of tubular members can be inserted therein from opposite ends. Thereafter, the toggle arrangement is locked so as to bring the split collars together thereby locking the tubular members together. Such a device is inadequate since it does not provide a completed seal around the joined tubular members. This becomes critical where the tubular members are fire hoses or oil pipelines, more especially in gas pipelines. Further, since these coupling devices secure two members together simultaneously both members must be positioned relative to each other before these coupling devices can be secured thereon.

Still other coupling devices have been constructed in such a manner that they cannot readily be used in positions of limited access. Such devices have been made with a plurality of components which must be assembled together upon making the connection between tubular members. This has required a time consuming and inefficient procedure for making the connection. Furthermore, in some instances it has been found that one of the parts necessary to the connection has been missing when the connection had to be made.

Accordingly, it is an object of the present invention to provide a coupling device which can be quickly and easily used to make a connection between a pair of tubular members.

It is another object of this invention to provide a coupling device which is utilized as a single unit.

It is another object of this invention to provide a coupling device for connecting tubular members together in fluid-tight relationship.

It is another object of this invention to provide a coupling device for coupling tubular members having externally threaded end portions together.

It is another object of the invention to provide a coupling device for tubular members which quickly releases the connection between a pair of tubular members.

Generally, this invention relates to a coupling device for coupling a pair of threaded members together such as a fire hose to a fire hydrant. The coupling device which is formed of a unit construction for ease of manual handling is adapted at one end for threaded securement to a fire hydrant whereas the other end is adapted to secure a fire hose in clamped threaded engagement therein.

The coupling device includes a first component which is provided with threads at one end to threadably engage a first tubular member and a split collar component which encircles the other end of the first component about a shoulder thereof. The split collar component is made of a pair of hingedly connected semi-cylindrical or Arcuate portions which are secured together by a hinge clamp. The split collar component also has a threaded portion for engaging a second tubular member. This threaded portion, however, contains threads which are formed to taper towards diametrically opposed points so that two sections of the threaded portion are substantially flat with respect to the surface of the hinged portions.

When in use, the first component of the coupling device is threaded onto a first tubular member, such as a fire hydrant, and the split collar component is positioned in an open position, that is, with the hinge clamp open. Thereafter, a second tubular member, such as a fire hose, is inserted within the threaded portion of the split collar component and the hinge clamp is closed to clamp the threaded portion against the fire hose. When in its clamped position the threads of the split collar component will engage the threads of the fire hose only at those sections where the threads project. The flattening out of the threads permit insertion of the externally threaded end of a fire hose without interference when the hose is inserted into the coupling device.

In order to release the split collar component, the hinge clamp is quickly and easily opened and the second tubular member removed.

These and other objects and advantages of the invention will become more apparent from the following detailed description and appended claims taken in conjunction with the accompanying drawings in which:

FIG. 1 illustrates the coupling device of the invention mounted on a fire hydrant in open position for reception of a fire hose;

FIG. 2 illustrates the coupling device in closed position coupling a fire hose to a fire hydrant;

Figure 3:
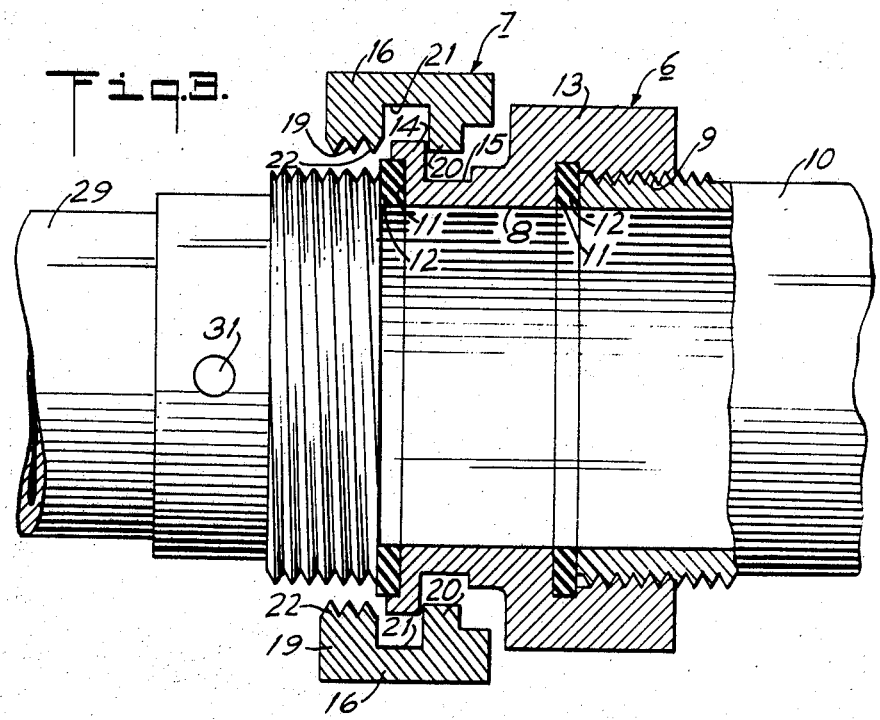
FIG. 3 illustrates a cross sectional view of the coupling device in open position.
Figure 4:
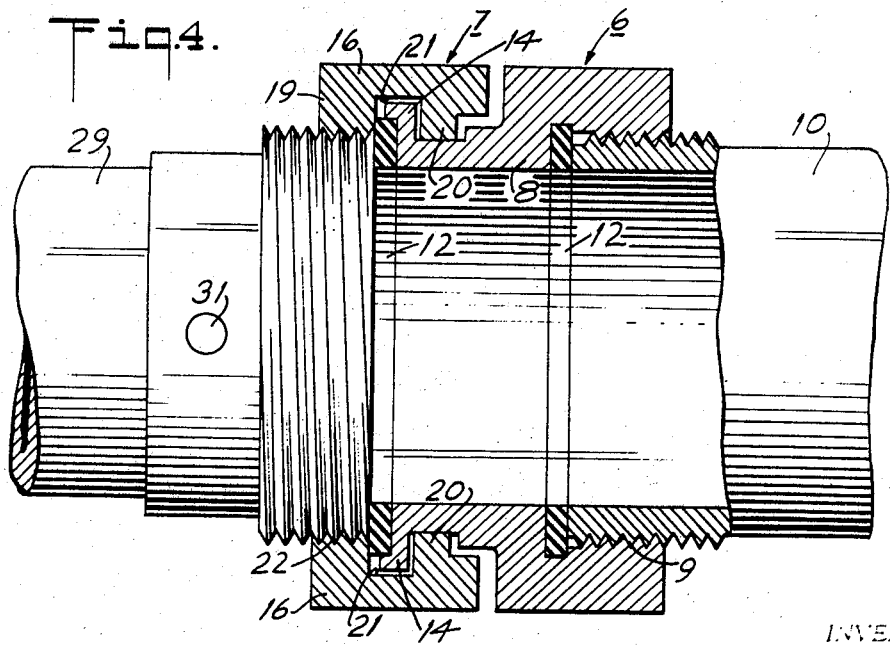
FIG. 4 illustrates the same cross sectional view of the coupling device in closed position.

Referring to the drawings, the coupling device 5 has a cylindrical component 6 and a split collar component 7 mounted on one end of the cylindrical component 6.

The cylindrical component 6 has a central bore 8 extending therethrough which is provided with a threaded counterbored section 9 for threadably engaging a conventional threaded spout 10 of a fire hydrant. In addition, a pair of recesses 11 and 11' is provided in the bore 8, one adjacent the threaded section 9 and the other at the end of the bore 8 and a suitable annular seal rings 12, 12' positioned in each of recesses 11 and 11' respectively. Preferably, seal ring 12' is secured in place by a suitable adhesive. Each seal ring 12 and 12' is sized to have a central aperture of substantially the same diameter as the bore 8 of the component 6.

The cylindrical component 6 has an exteriorly raised portion 13 which extends from one end of the component at least across the threaded section 9 and recess 11. At the other end of the component 6 there is a radially outwardly extending shoulder 14. A stepped recess 15 is disposed between the raised portion 13 and shoulder 14.

The split collar component 7 includes a pair of complementary annular semi-circular collar portions 16 which respectively are hingedly connected to each other at their opposite ends by a suitably hinge pin connection 17 for the hinged ends and a clamp assembly 18 which bridges the other ends and is adapted and arranged for relatively moving these ends toward and away from each other.

Each of the split collar portions 16 is formed interiorly with a threaded end section 19, a shoulder 20 and a recess 21 between the threaded end section 19 and shoulder 20. The threaded end section 19 has threads 22 which are tapered from the middle towards both ends of the collar portion 16 so that the threads 22 become flush with the inner peripheral surface of the collar portion 16 at points adjacent the respective ends of the collar portion 16. The shoulder 20 and recess 21 of each collar portion 16 are sized to mate with the shoulder 14 and the recess 15 of the cylindrical component 6 and permit relative rotation between the cylindrical component 6 and the split collar component 7.

The hinge clamp assembly 18 includes an arcuate rib 23 hingedly secured at one end to one of the collar portions 16 by a hinge pin 24 and a latch 25 pivotally secured at one end to the other of the collar portions 16 by a pivot pin 26. The latch 25 is also hingedly secured at an intermediate point to the free end of the rib 23 by a pin 27 so that upon pivoting of the latch 25 the ends of the split collar portions 16 thereat are moved relative to each other. The latch 25 is bifurcated at the pivot pin 26 to form a pair of legs 28 which are shaped with respect to the surface of the collar portion 16 and pin 25 secured therein so that the latch 25 is limited in the amount of pivoting in order to maintain the split collar portions 16 on the component 6 at all times and so that the latch 25 will be locked in place when in a closed position. Thus, the split collar component 7 and cylindrical component 6 form a single interconnected coupling device. Moreover, whenever the clamp assembly is in open position, the free end of the latch 25 is in extended position as illustrated in FIG. 1 whereby it may be readily grasped for actuation to clamp the ends of the collar portions 16 in closed position.

In typical operation, the coupling device 5 is first threaded onto a corresponding threaded spout 10, e.g. a fire hydrant, until the seal 12 sealingly abuts the spout 10. Next the latch 25 is brought to position for opening the releaseable ends of the collar portions 16 as shown in FIG. 1. The externally threaded end of a fire hose 29 is inserted between the collar portions 16 against the seal ring 12' whereupon the latch 25 is pivoted towards the collar portion 16 away from the rib 23 to bring the spaced collar portion ends together and to lock the same in a closed position on the fire hose 29. When the fire hose is locked between the collar portions 16, the threads 22 project into the threads of the fire hose 29 to maintain a tight fit. Further, when locked in place, the fire hose sealingly engages the seal 12' so as to prevent any leakage of fluid through the coupling. If desired, the pressure of the sealing engagement may be increased by a slight turn of the hose as by the use of a fire hose wrench adapted to co-act with pin 31 on the threaded terminous of the fire hose. In any case a slight turn is all that is required.

When the fire hose is to be uncoupled from the fire hydrant, the latch 25 is quickly and easily pivoted towards the rib 23 to open the collar portions 16 to permit removal of the fire hose.

Because the threads 22 of the coupling device 5 are tapered into the bore to leave two diametrically opposed smooth surfaces, the threads 22 will not interfere with the insertion and withdrawal of the threaded end of a fire hose, notwithstanding the limited separation of the ends of split collar portions 16 which prevents removal of the split collar component 7 from the cylindrical component 6.

It is noted that the bore of the coupling device is of a size to substantially conform to the spout opening so as to avoid any obstruction to the path of fluid flow from the spout 10.

Also, it is noted that the cylindrical component 6 of the coupling device is provided with suitable tool engaging protuberances 30 to facilitate securement to a fire hydrant spout 10.

The invention thus provides a coupling device which is easy to use, simple to manage and of limited bulk so that it can be used to couple tubular members together where there is a space problem. Once the coupling device has been locked in place a fluid tight seal is maintained between the connected tubular members so that there can be no leakage of the fluid or gas passing between the tubular members.

The invention further provides a unit construction wherein all the components of the coupling device are interconnected to each other so that there can be no loss of parts. Furthermore, the invention provides a coupling device which need not be accurately fabricated since there is some room for play between the hinged portions of the coupling device.

While it is primarily intended that the coupling device be used for coupling fire hoses to fire hydrants, it is noted that the coupling device can also be effectively used for coupling any types of tubular members together such as in oil or gas pipe lines, water pipelines and irrigation lines. In such cases, the cylindrical component may be threaded internally or externally depending upon the position of the threads on the tubular member on which the cylindrical component is to be secured. Since the device can be quickly and easily used, the time it takes to establish and disestablish a connection between tubular members is substantially reduced.

What is claimed is:

1. A coupling device for a pair of tubular members comprising
   a cylindrical component having means adjacent one end thereof for securement to a first tubular member, and
   a split collar component fixedly mounted adjacent the other end of said cylindrical component having a pair of complementary semi-circular collar portions hingedly secured together at the hinged ends thereof and a hinge clamp assembly hingedly secured to the other ends of said collar portions for selectively moving said other ends toward and away from each other, said collar portions projecting from said cylindrical component for securing a second tubular member therebetween upon actuation of said clamp member to move said other ends toward each other, each of said collar portions including an interiorly threaded section having threads projecting inwardly thereof, said threads tapering circumferentially from the middle towards both ends of each collar portion.

2. A coupling device as set forth in claim 1 wherein said cylindrical component includes a bore and a pair of spaced apart seals mounted in said bore for sealingly engaging the respective first and second tubular members.

3. A coupling device as set forth in claim 1 wherein said means is a threaded section at one end of said cylindrical component whereby said cylindrical component is adapted to be threadably mounted on a tubular member.

4. A coupling device as set forth in claim 1 wherein said cylindrical component adjacent said other end thereof includes an outwardly extending shoulder and said collar portions include a recess enveloping said shoulder to mate said split collar component with said cylindrical component in relative rotational relationship therewith.

5. A coupling device as set forth in claim 1 wherein said threads taper into the interior surfaces of said collar portion at points spaced from the ends of said collar portion to facilitate insertion of an externally threaded tubular member in said split collar portion.

6. A coupling device as set forth in claim 1 wherein said hinge clamp assembly includes a rib hingedly secured to one of said collar portions and a latch pivotally secured at one end to the other of said collar portions and intermediately hingedly secured to said rib whereby said collar portions are moved relative to each other upon pivoting of said latch.

7. A coupling device as set forth in claim 1 wherein said cylindrical component includes a pair of spaced seals at opposite ends thereof for sealingly engaging the first and second tubular members, said split collar component is mounted on said cylindrical component in mating engagement therewith, and said hinge clamp assembly includes a rib hingedly secured to one of said collar portions and a latch pivotally secured at one end to the other of said collar portions and intermediately hingedly secured to said rib whereby said collar portions are moved relative to each other upon pivoting of said latch from an open position to a closed position and vice versa for coupling of the second tubular member to the first tubular member.

8. A coupling device as set forth in claim 1 wherein said threads taper to the interior surface of said collar portion at points spaced from the ends of said collar portion whereby a pair of diametrically opposed flat surfaces are provided between said threads of said collar portions to facilitate insertion of a threaded second tubular member in said split collar portion when in an open position.

9. A coupling device for a pair of tubular members comprising a cylindrical component having means adjacent one end thereof for securement to a first tubular member, a split collar component fixedly mounted adjacent the other end of said cylindrical component having a pair of complementary semi-circular collar portions hingedly secured together at the hinged ends thereof, and a hinge clamp assembly hingedly secured to the other ends of said collar portions for selectively moving said other ends toward and away from each other, said collar portions projecting from said cylindrical component for securing a second tubular member therebetween upon actuation of said clamp assembly to move said other ends toward each other, said hinge clamp assembly including a rib hingedly secured to one of said collar portions and a latch pivotally secured at one end to the other of said collar portions and intermediately hingedly secured to said rib, said latch having a pair of legs at said one end, said legs having a shape for limiting movement of said latch on said other collar to maintain said split collar component on said cylindrical component and for locking said latch in a closed position whereby said collar portions are moved relative to each other upon pivoting of said latch.

References Cited
UNITED STATES PATENTS

| | | | |
|---|---|---|---|
| 1,762,065 | 6/1930 | Lally | 295—33 |
| 906,135 | 12/1908 | Hilton | 285—34 |
| 2,052,038 | 8/1936 | Shoron | 285—35 |
| 2,327,714 | 8/1943 | Iftiger | 285—35 |
| 2,368,758 | 2/1945 | Grotnes | 24—273 |
| 2,428,391 | 10/1947 | Smith | 287—111 X |
| 3,041,088 | 6/1962 | Brandon | 285—373 X |

CARL W. TOMLIN, Primary Examiner

DAVE W. AROLA, Assistant Examiner

U.S. Cl. X.R.

285—175, 311